June 21, 1938.  E. A. WIDMANN  2,121,461
SEED GERMINATING MACHINE
Filed Jan. 28, 1937  3 Sheets-Sheet 1
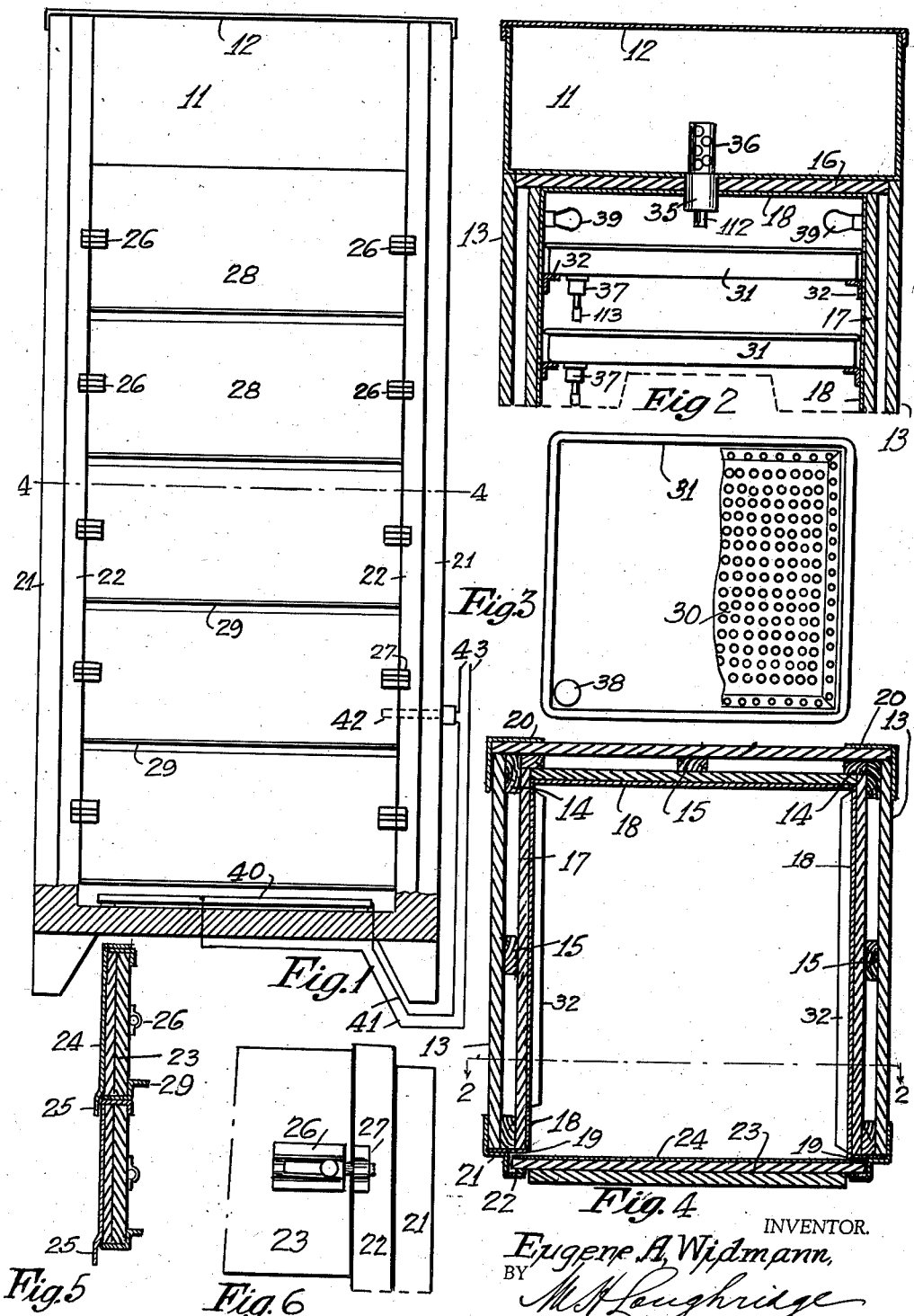
INVENTOR.
Eugene A. Widmann,
BY
M. H. Loughridge
ATTORNEY.

June 21, 1938.  E. A. WIDMANN  2,121,461
SEED GERMINATING MACHINE
Filed Jan. 28, 1937   3 Sheets-Sheet 2
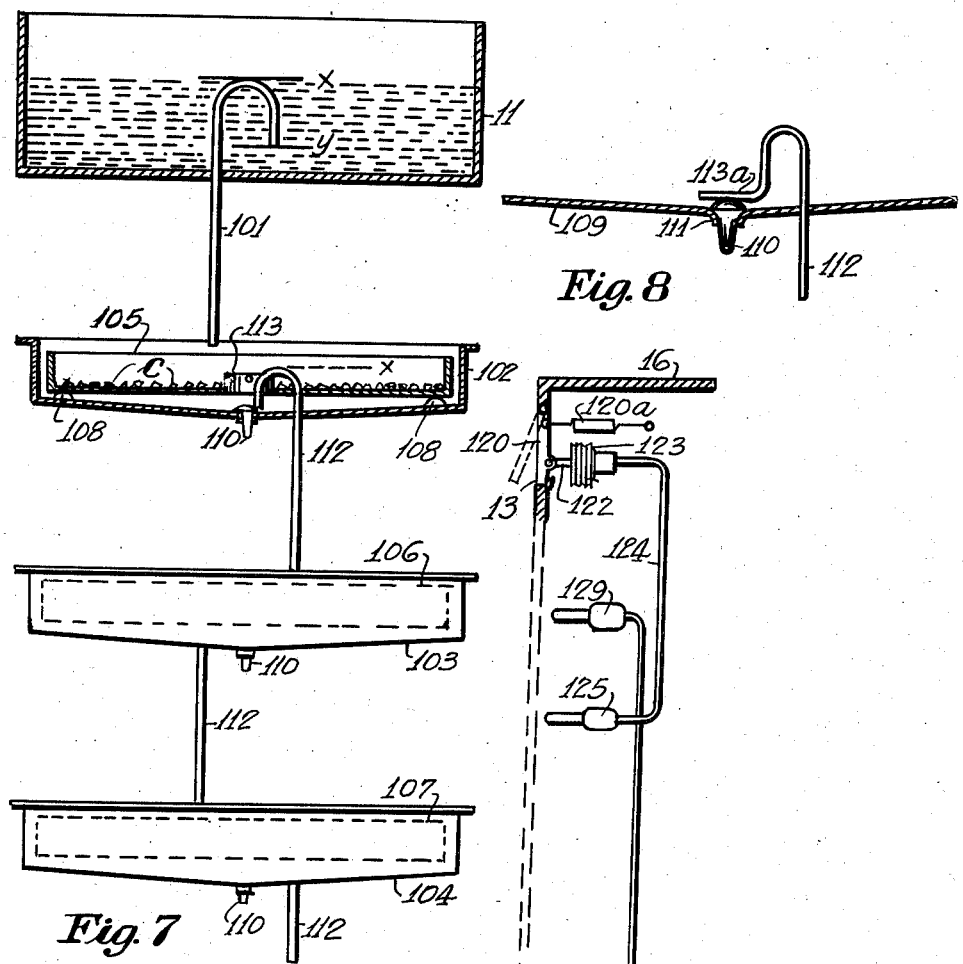
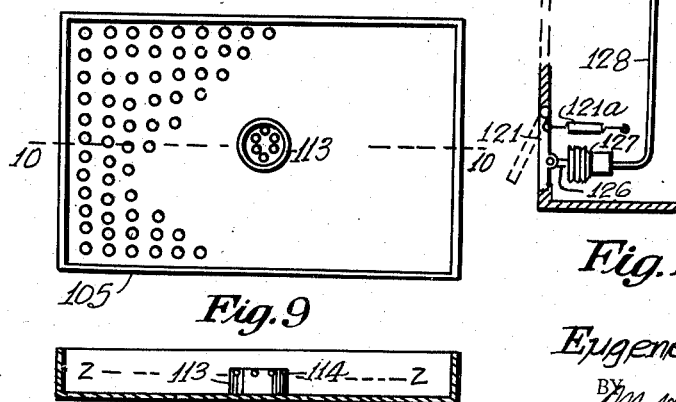
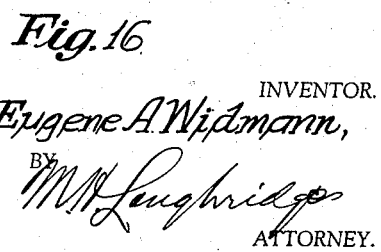
INVENTOR.
Eugene A. Widmann,
BY
ATTORNEY.

June 21, 1938.  E. A. WIDMANN  2,121,461
SEED GERMINATING MACHINE
Filed Jan. 28, 1937  3 Sheets-Sheet 3
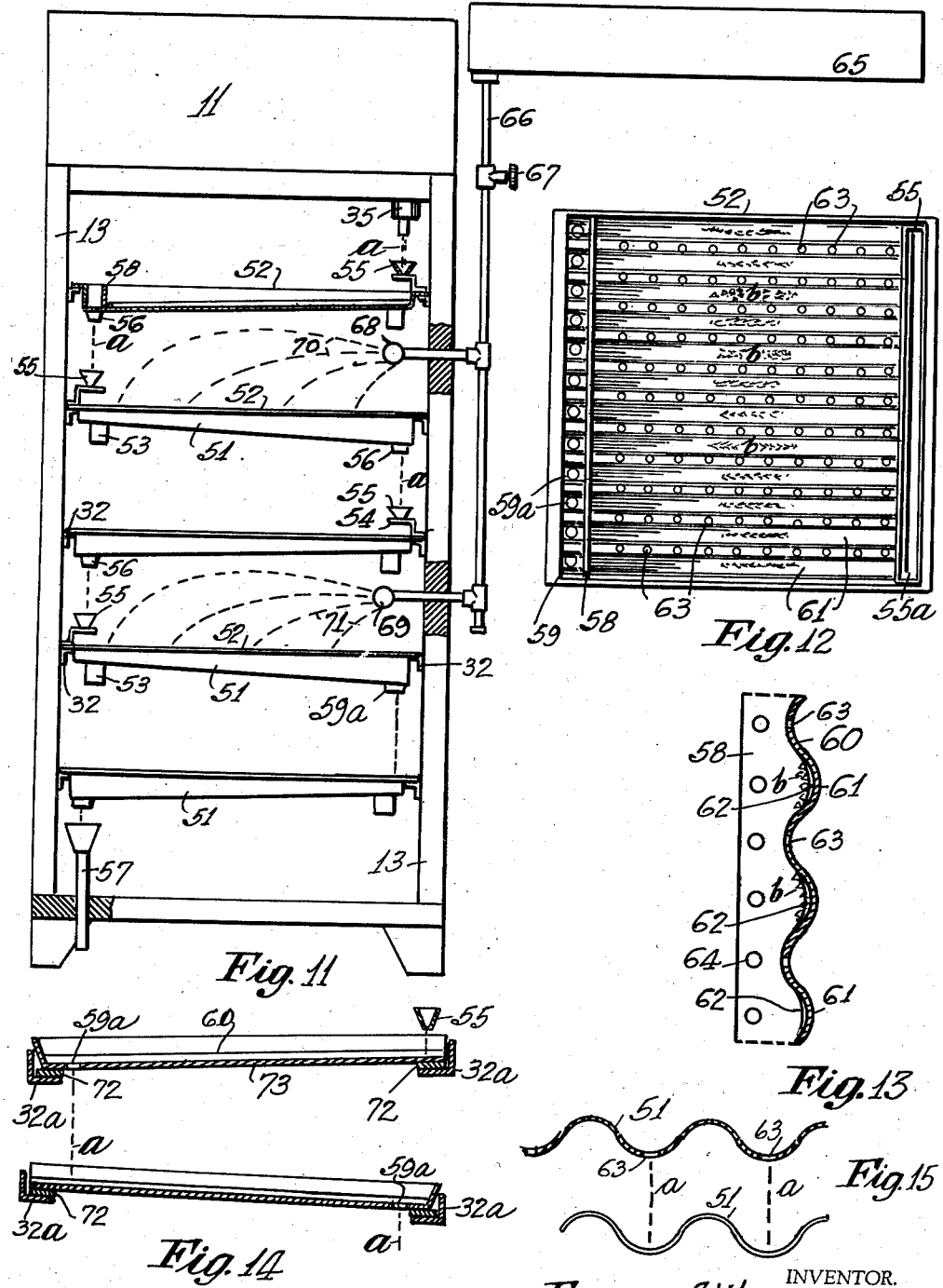
INVENTOR.
Eugene A. Widmann
BY
ATTORNEY.

Patented June 21, 1938

2,121,461

UNITED STATES PATENT OFFICE 2,121,461

SEED GERMINATING MACHINE

Eugene A. Widmann, New York, N. Y.

Application January 28, 1937, Serial No. 122,780

11 Claims. (Cl. 47—16)

This invention relates to seed germinating machines of the type in which the seed is germinated or sprouted in a cabinet which is subject to a regulated temperature and is intermittently supplied with a liquid nutrient solution to promote the rapid growth of the seed into sprouts, which, in a few days mature into an edible food. An object of the invention is to provide a regulated flow of the nutrient solution from the top to the bottom of a vertical tier of troughs containing the seed; another object of the invention is to provide a cabinet with heat insulated walls and with a tier of panels vertically slidable and placed with the edge of one on top of the edge of the other to form the closure of a door for the cabinet; another object of the invention is to provide a cabinet with an electrical heater which may be controlled by a thermostat to maintain an even temperature and another object of the invention is to provide a nutrient solution applied to the seed and the roots or applied as a spray to the shoots or sprouts as they develop from the seed, and another object is to provide solutions for promoting the growth of the seed in the cabinet from two different sources.

Another object of the invention is to provide troughs for the seed with corrugated bottoms in which the seed is placed in the depressions of the bottom and a nutrient solution flows by gravity over or through the seed from one trough to the other.

Other objects of the invention will be more particularly understood from the following specification and the accompanying drawings, in which:

Fig. 1 is a front elevation of a cabinet, partly sectioned, constructed according to this invention;

Fig. 2 is a vertical cross-section of the cabinet on line 2—2 of Fig. 4;

Fig. 3 is a plan view of one of the troughs and trays in which the seed is placed;

Fig. 4 is a transverse section of the cabinet on line 4—4, Fig. 1;

Fig. 5 is a vertical cross-section of the sliding door panels;

Fig. 6 is a detail showing the fastening of the door panel;

Fig. 7 is a diagram of a syphon arrangement for feeding the liquid nutrient to the troughs.

Fig. 8 is a sectional detail of the sump in the trough;

Fig. 9 is a plan view of a seed tray;

Fig. 10 is a section of the seed tray on line 10—10, Fig. 9;

Fig. 11 is a front view of a modified cabinet with the door removed, and with certain parts sectioned to show the construction;

Fig. 12 is a plan view of a corrugated trough used in Fig. 11;

Fig. 13 is a detail of the corrugated trough with the bottom part sectioned;

Fig. 14 is a longitudinal section of the corrugated troughs, and Fig. 15 is a sectional detail.

Fig. 16 is a diagram of a thermostatically controlled system of ventilation.

A machine for germinating seed under artificial stimulation in a cabinet is disclosed in U. S. Patent 2,040,161, May 12, 1936. The present invention is an improvement on this application and provides a machine of this type that is compact and that is adapted to the growth of barley but may be used for other seeds. This application is a continuation in part of co-pending application 65,248 of February 24, 1936.

In this system a closed cabinet is provided with a vertical tier of troughs or trays to receive the seed and the nutrient solution used to accelerate the growth of the seed. This solution is supplied at intervals and drained off at intervals until the germination reaches maturity.

The cabinet shields the seed and sprouts from drafts and an electric heater and ventilator maintains a substantially uniform temperature in the cabinet. The walls of the cabinet are heat insulated and it is provided with a heat insulated door made of independent panels of comparatively light material, preferably an insulating board, which are placed with the edge of one on top of the edge of the other in a vertical slide so that the cabinet may be opened opposite any section or trough without opening the other sections, or allowing the confined air in the cabinet to escape. This is secured by moving the section or panel in the slide opposite the desired trough.

A syphon is provided in the tank or trough containing the solution and syphons may also be placed in each trough of the vertical tier. As the liquid rises to a predetermined height the syphon is established and a predetermined quantity of the liquid flows out of the tank to the top trough and from this trough it is syphoned to the troughs below through a regulated interval of time. A drip pan is provided to drain the troughs after the syphon operation.

It is essential to supply the liquid nutrient to the seed and to the roots of the growing plant. For this purpose the troughs containing the seed may be provided with a perforated tray to hold the seed in place or they may be corrugated and arranged on an inclined plane so that liquid applied at the high end will flow to the lower end and from the top trough it may be arranged to flow by gravity to the troughs below. The seed is placed in the depressions of the corrugations where the slow flow of the liquid takes place. The ridges may be perforated so that if an excess liquid is used it will drain off through these perforations. A perforated barrier may be provided in the tray to drain off excess liquid from the top.

The seed and the plants absorb the liquid as it flows from trough to trough so that in a tier of troughs there is a greater quantity of liquid flow in the upper troughs than in the lower troughs. This may be compensated for by applying additional liquid to the intermediate troughs. The liquid nutrient may be applied in a concentrated form from one source and diluted by water or a less concentrated liquid from another source. The liquid may also be sprayed on top of the trays to cover the seed and the sprouts as the growth progresses.

In the drawings, 11 is the liquid tank preferably placed at the top of the cabinet and it may be provided with a sliding cover 12. The wall of the cabinet 13, made from heat insulating board, is built around the corners 14 and the spacers 15 which support the inner wall board 17, enclosing an air space between the inner and outer wall boards as shown in Fig. 4. The interior of the cabinet is lined with sheet metal 18 such as galvanized iron or aluminum foil. An insulating board 16 may be provided at top and a corresponding board at bottom. The sheet metal lining may be bent around the edge of the door as indicated at 19. The cabinet is provided with angular metal corners 20 and with metal corners 21 on front, provided with a vertical channel at 22 to receive the panels of the door.

The door opening is closed by a row of transverse panels 28, placed with the edge of one on top of the edge of the other in the vertical channels 22. Each panel comprises a pair of boards 23, having a sheet metal lining 24 on the inner side which projects at 25, Fig. 5, to cover the seam between the panels; a cleat is provided at 29 by which any panel can be raised and when raised the panels may be secured in position by the bolts 26, engaging the sockets 27. The temperature of the cabinet is usually higher than the outside temperature and by this arrangement of independent sliding panels, any section of the cabinet may be opened without opening the remaining portion of the cabinet. The panels are comparatively light and any number of them can easily be raised to expose the section below the last raised panel. The top panel slides opposite the tank 11 as the lower panels are raised.

The walls of the cabinet are provided with rows of opposed angles 32, Fig. 2, which form supports for the troughs 31, supporting these troughs in vertical tiers below the tank 11. The seed is placed in the perforated trays 30 which are placed in the troughs and the growth occurs between the troughs of the tier. In the form shown in the drawings, the troughs are of a size convenient for one person to carry and are removable with the trays and the sprouts. Where larger sizes are used, trays are removable with the sprouts while the troughs are stationary as shown in the patent above referred to. The tank 11 is provided with a sump 35 which is protected by a perforated tube 36 and a syphon tube 112 is placed in this sump to discharge liquid nutrient from the tank 11 to the top trough 31. This trough is slightly inclined towards the corner 38, Fig. 3, where the sump 37 is located for another syphon from the top trough to the next trough below. Each trough is provided with a similar syphon 37 to drain the liquid from the trough above to the next trough below until it has flowed through all the troughs of the tier. In each case the liquid accumulates in the trough until the syphon is started, when the flow continues until the syphon is broken and another interval elapses until the syphon is again started.

The cabinet is preferably shielded from light and from drafts, but artificial light may be applied as necessary by the ultra-violet lights 39. When it is necessary to heat the cabinet, the electric heater 40 is placed on the bottom and is controlled by the circuit 41 and the thermostat 42 which may be placed in any convenient location in the cabinet and controls the electric supply on wires 43. Ventilators may be provided at the top of the cabinet.

The cabinet in Fig. 11 is provided with a tier of troughs 52 which are alternately inclined in opposite directions and in which the liquid applied to the upper trough flows through all the troughs to the bottom. The troughs are provided with a ledge 52 on their edge which rests on the angles 32 and the bottom is inclined as indicated at 51. A support is provided at 53 which levels the trough when it is removed from the cabinet and rests on a stand; this also forms a transverse brace for the corrugations of the troughs. A bracket is provided at the shallow end of the trough which supports the gutter 55, provided with a slit 55a, Fig. 12, in its apex, which receives and distributes the stream of liquid $a$ above the corrugations 60. The ridges of the corrugations are perforated at 63 so that excess liquid can drain through to the trough below. A barrier 58 is provided at the deep end of the trough and behind the barrier in the space 59 a row of apertures 59a are located in the depressions of the corrugations so that liquid escaping through the apertures 62, Fig. 13, between 58 and the bottom 61, drains off through the spigot 56 as indicated by stream $a$ to the gutter 55 at the shallow end of the trough below, and so on throughout the troughs of the tier. The seed is located in the depressions as indicated at $b$ but cannot pass through the apertures 62. Barrier 58 may be provided with apertures at 64 to allow excess liquid to escape.

The detail in Fig. 14 shows troughs made from corrugated stock with the lower end turned up to form a barrier. In this construction the liquid from gutter 55 flows along the depression 73 where the seed is located, to the lower end of the trough. Here there is a perforation 59a for each depression and these register with the depressions of the trough below so that the flow passes from depression of one trough to the registering depression of the trough below, as indicated in Fig. 15, until it is discharged. The corrugations are braced by the cross bars 72 which rest upon the angles 32a of the cabinet.

An additional liquid supply is provided in the tank 65, which is conducted through pipe 66, valve 67 and nozzles 68 and 69 to the troughs where it is distributed as a spray at 70 and at 71. The waste liquid is taken off at 57. The spray enables the liquid to be applied to the sprouts of the growth and it compensates for the liquid absorbed by the roots in the trough above. It does not interfere with the liquid applied to the roots through the corrugations and it may be a liquid of a different character than that applied to the roots, as, for instance, a solution particularly adapted to the shoots, while the other liquid is adapted to the roots of the plants. In some cases it may be desirable to apply the entire solution as a spray instead of by a flow.

To economize space, the trays with the seed are first steeped in water until the seed softens, then the trays are placed in the cabinet comparatively close together, but as the shoots develop the trays are removed and placed wider apart to provide space for the sprouting shoots. In practice, barley can be harvested in about five days' time.

The syphon arrangement in Fig. 7 may be used to supply the liquid nutrient in tank 11 to the troughs 102, 103, 104, etc. This comprises the syphon tube 101 in tank 11 which discharges when the liquid level reaches line X and continues to discharge until the syphon breaks when the liquid reaches line Y. This liquid is discharged into tray 105 resting on pads 108 in trough 102. A second syphon 112 is provided from trough 102 to tray 106 and trough 103 and discharges when the liquid level reaches line X. In the same way the troughs 103, 104, with the seed trays 106, 107, etc., throughout the tier are supplied with the liquid by the syphon tubes 112 which transfers it from the tank above to the tank below. The trough is provided with a sump at 109 where the bottom is perforated at 111 to receive the removable nail or tapered plug 110. This plug is not a close fit in the hole 111, with the result that the liquid slowly drips down the plug to the trough below. The plug 110 is removable so that it can be cleaned each time the tank is flushed. The end of the syphon tube 113a is located in the sump horizontally.

The trays may be provided with a cylindrical barrier in the centre at 113 with perforations at 114 on the level of the liquid line Z so that the liquid above this line drains off into the interior of 113 where the perforations of the tray are free from seed and the liquid can freely flow to the tray below.

The size of the syphon tubes 101 and 112 is comparatively small so that a considerable time is required to discharge the liquid in tank 11 from X to Y, which liquid saturates the tier of troughs below. In practice the tank 11 is filled to line X daily when the syphon flow in tube 101 begins. As soon as the level in the top trough reaches line X, the discharge begins in the first tube 112 and continues at the same rate as tube 101 supplies the liquid. This fills the trough 103 to line X when the discharge syphon from this trough begins and the process is repeated until all the troughs are saturated and the top syphon breaks at line Y. Each trough is thus syphoned of liquid which drains the liquid from the seed trays. The residue that is not taken up by the syphon drips through aperture 111 on the plug 110 thereby removing all the liquid before a new supply is provided.

It is found in practice that from one-half hour to one hour may be required to flush and empty each trough by this syphon arrangement which provides a steady, slow-moving liquid supply for this purpose and that for most seeds one flushing daily is sufficient. This moisture remains in the seed and on the roots in the closed cabinet for a considerable time after the liquid has drained off.

In certain locations it is necessary to ventilate the cabinet to prevent overheating. The arrangement in Fig. 16 may be used for this purpose in which a ventilating door 120 is provided in the wall 13 of the cabinet at the top, normally held closed by the spring 120a and is connected by rod 122 with the bellows 123 of the expansion device connected by tube 124 with the thermostat 125. When the temperature rises to expand the medium in 125 the bellows 123 expands and opens the door 120. When the temperature is reduced the bellows contracts and the spring 120a closes the door.

A second ventilator may be provided at the bottom of the cabinet including the door 121, in wall 13, connected by 126 with bellows 127 which connects by tube 128 with thermostat 129; the operation is similar to door 120.

The location of the ventilators and the thermostats is determined by the conditions necessary to maintain a fairly uniform temperature in the cabinet. Any form of thermostat that has the proper temperature range can be used for operating the ventilators.

Having thus described my invention, I claim

1. In a seed germinating machine, the combination, a cabinet enclosing a series of troughs placed in a vertical tier, said troughs receiving the seed and a nutrient solution to promote the seed germination, said cabinet provided with heat insulating walls and a closure made in a plurality of separate removable panels placed one above the other, an electric heating element in the bottom of said cabinet and a thermostat in said cabinet controlling said heating element.

2. A seed germinating machine comprising a cabinet, removable troughs for said cabinet, said troughs having a corrugated bottom with perforations in the ridges and the seed placed in the depressions of the corrugations, said troughs being placed one above the other and with their bottoms on an incline, means for supplying and distributing a nutrient solution to the top trough and means for supplying this solution by gravity flow to the troughs below.

3. A seed germinating machine comprising a cabinet, removable troughs for said cabinet, said troughs having a corrugated bottom with the seed placed in the depressions of the corrugations and placed with the bottoms inclined from the horizontal, a gutter at the high end of the trough and a barrier at the low end, said barrier separating a row of perforations in the bottom from the rest of the trough, a nutrient solution supplied to the trough through said gutter and removed from the trough after it passes said barrier through the perforations.

4. A seed germinating machine comprising a cabinet, removable troughs placed in a vertical tier in said cabinet, said troughs having perforated bottoms and being placed on an incline so that liquid will flow from the upper trough to the next trough below, through said perforations, flowing from one end to the other, and so on for the succeeding troughs, said troughs receiving the seed to be germinated and means for spraying a liquid on said troughs during the germination.

5. A seed germinating machine comprising a cabinet, removable troughs placed in a vertical tier in said cabinet, said troughs being placed on an incline with the lower ends being located alternately in opposite directions and so arranged that a liquid will flow along the top trough to the next trough below, and will flow along this trough to the next below and so on, said troughs receiving the seed to be germinated, means for supplying a liquid to the upper end of the top trough to flow along the troughs and means for supplying a spray of liquid to the plant growth of germination.

6. A seed germinating system comprising a cabinet, a trough in said cabinet, the seeds to be germinated being spread in a layer on said trough, means for supplying a nutrient solution to saturate the seed, means for drawing off said solution after it passes over said seed and independent means for applying a solution to the plants produced from the seed.

7. In a seed germinating system, the combination, a tank with a nutrient solution, a series of troughs each having a sump arranged in a vertical tier below said tank to receive the seed, a syphon for the flow of said solution from said tank to the first trough for intermittently causing the flow of a measured quantity of said solution to the top trough, syphons for transferring the solution successively to the troughs below throughout the series and providing an uninterrupted flow from the tank to the troughs and a drip plug located in each sump for draining the residue of the liquid from each trough.

8. A seed germinating machine comprising a trough having a sump for receiving a liquid, a seed tray in said trough, a syphon for emptying said trough and a removable drip plug located in said sump for draining the residue of the liquid from the sump.

9. A seed germinating machine comprising a trough for receiving a liquid, a tray with perforations containing the seed located in said trough, a barrier for a portion of said tray to prevent the seed from getting access to said portion, said barrier having perforations to drain the liquid when it reaches a predetermined height and means for draining said trough.

10. A seed germinating machine comprising a cabinet having a tier of troughs with seed trays, a ventilator for the top and a second ventilator for the bottom of said cabinet and a first means responsive to temperature in one location in said cabinet and operatively connected with the top ventilator and a second means responsive to temperature located above the first means and operatively connected with the bottom ventilator.

11. A seed germinating machine comprising a cabinet having a tier of troughs with seed trays, a ventilator for the top of said cabinet, a second ventilator for the bottom of said cabinet, a thermostat in said cabinet operating said first ventilator and a second thermostat in a different location in said cabinet operating said second ventilator.

EUGENE A. WIDMANN.